United States Patent
Peters et al.

(10) Patent No.: US 6,425,365 B1
(45) Date of Patent: Jul. 30, 2002

(54) INTERNAL COMBUSTION ENGINE SHUTDOWN METHOD AND CONTROL SYSTEM

(75) Inventors: Mark William Peters, Wolverine Lake; David Lee Boggs, Bloomfield Hills, both of MI (US); Jerry D. Robichaux, Tucson, AZ (US); Stephen John Kotre, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/692,918

(22) Filed: Oct. 20, 2000

(51) Int. Cl.⁷ ................................................ F02B 77/00
(52) U.S. Cl. .............................................. 123/198 DB
(58) Field of Search ............................ 123/520, 568.12, 123/198 DB

(56) References Cited

U.S. PATENT DOCUMENTS

| | | | |
|---|---|---|---|
| 4,275,696 A | 6/1981 | Yoshida et al. | |
| 5,020,503 A * | 6/1991 | Kanasashi | 12/520 |
| 5,259,412 A | 11/1993 | Scott et al. | |
| 5,341,787 A | 8/1994 | Zabeck et al. | |
| 5,371,412 A * | 12/1994 | Iwashita et al. | 123/520 |
| 5,870,997 A | 2/1999 | Mukai | |
| 6,112,729 A * | 9/2000 | Barnes et al. | 123/568.21 |
| 6,216,452 B1 * | 4/2001 | Naito et al. | 123/305 |

* cited by examiner

Primary Examiner—Noah P. Kamen

(57) ABSTRACT

Periodic shutdown of the internal combustion engine (12) during operation of a hybrid electric vehicle (HEV) is achieved by shutdown of a vapor management valve (VMV) of the engine evaporative emission control system and an EGR valve (150) of the tailpipe emission control system at the time an engine shutdown command is provided to a controlled engine shutdown routine that, after closing of the VMV and EGR valves, then commands disabling of the engine fuel injectors (160) in a manner to stop engine operation.

12 Claims, 3 Drawing Sheets

INTERNAL COMBUSTION ENGINE SHUTDOWN METHOD AND CONTROL SYSTEM

BACKGROUND OF THE INVENTION

1. Field of the Invention

The present invention relates to a method and control system for shutdown of the internal combustion engine of a hybrid electric vehicle.

2. Description of Related Art

Evaporative emission control systems are widely used in conventional internal combustion engine (ICE) powered vehicles to reduce evaporated fuel, i.e., fuel vapor emissions from the fuel system to the atmosphere that is alleged to contribute to smog. In such evaporative emission control systems, fuel vapor from the fuel system and from a vapor storage canister are drawn into the engine via a vapor management valve (VMV). The amount of fuel vapor introduced into the intake manifold, and thus into the engine cylinders to be combusted, is proportional to how much the VMV is opened. To maintain stoichiometric air/fuel ratio in the engine cylinder that is optimum for minimizing tailpipe emissions, a typical VMV control strategy accounts for how much fuel in the engine cylinder is due to the VMV. In this way, the fuel control strategy can command the fuel injectors to deliver proportionately less fuel than would normally be scheduled if the VMV was not allowing fuel vapor into the engine cylinder.

In conventional tailpipe emissions control systems of ICE powered vehicles, an exhaust gas recirculation (EGR) valve is used to recirculate a portion of the hot exhaust gases back into the intake manifold, thereby diluting the air/fuel charge and lowering combustion temperatures to reduce the amount of NOx (oxides of nitrogen) that are created. The amount of exhaust gases recirculated into the intake manifold, and thus into the cylinders, is proportional to how much the EGR valve is opened. Though mostly made up of inert byproducts of the previous combustion event, the exhaust gases do partially contain some unburned fuel vapor.

In a hybrid electric vehicle (HEV), the ICE is periodically operated alone, or in conjunction with one or more electric motors, as instructed by a vehicle system controller (VSC). The VSC processes wheel torque requests from the driver via the accelerator pedal and determines how best to deliver that wheel torque from a minimal fuel consumption standpoint. For example, the VSC determines whether to use the electric motors only with the ICE "off", the ICE "on" with the electric motor(s) "off", or to use a hybrid mode where both the electric motor(s) and the ICE are "on" and contributing to the desired wheel torque. Thus, during operation of the HEV, the ICE is periodically started and stopped as instructed by the VSC during the course of a drive cycle.

During an engine shutdown in a HEV drive cycle, the VMV and EGR valve may be flowing at different rates depending on when the shutdown occurs, and thus may contribute fuel vapor amounts to the intake manifold that vary from one engine shutdown to the next. This, in turn, leads to inconsistent amounts of residual fuel vapor left in the intake manifold from one subsequent engine restart to the next. Because of the many engine shutdowns and starts in an HEV, it is desired to minimize the amount of tailpipe emissions during these events. However, with an inconsistent amount of residual fuel vapor, it becomes very difficult to deliver the proper amount of fuel through the injectors from one engine start to the next during the course of a drive cycle. Thus, tailpipe emissions may vary from one engine start to the next during a drive cycle.

SUMMARY OF THE INVENTION

The present invention provides, pursuant to one embodiment, a method and control system for shutdown of the ICE wherein a VMV of the evaporative emissions control system and an EGR valve of the tailpipe emission control system are disabled (shut off or closed) at the time of an engine shutdown. A specific embodiment of the invention involves ICE shutdowns that occur during the drive cycle of an HEV. The shutdown command is provided by a vehicle system controller to a controlled engine shutdown routine of an engine controller that, after closing of the valves, commands disabling of the engine fuel injectors to stop engine operation. The fuel injectors can be disabled in a ramp mode over time where individual fuel injectors are disabled in a calibratable sequence. The vehicle system controller and the engine controller can reside in one or separate control modules.

In an illustrative embodiment of the invention, the VMV and EGR valves of the ICE are disabled (shut off) at the time the engine shutdown command is provided to a controlled engine shutdown routine of the engine controller, and prior to the fuel injectors being disabled by the controlled engine shutdown routine. After the fuel injectors are disabled, the vehicle system controller instructs an electric motor of the HEV to spin the internal combustion engine for a predetermined time, thereby pushing residual fuel out of the intake manifold into the catalytic converter to be converted. The controlled engine shutdown routine commands the ignition system to continue firing the spark plugs during the time periods that the fuel injectors are being disabled and the engine is being spun by the electric motor until the engine speed drops below a predetermined value.

The present invention is advantageous to provide a more consistent amount of residual fuel vapor in the intake manifold of an ICE at each engine shutdown. The present invention is further advantageous to control shutdown of an ICE of an HEV in a manner that provides a more consistent amount of residual fuel vapor in the intake manifold of the ICE at each engine shutdown and thus at each engine restart as the engine is cycled between the "on" state and "off" state during operation of the HEV. This is accomplished by eliminating contributions of fuel vapor to the intake manifold from the VMV and EGR valve at engine shutdown. The engine thereby can be restarted with a more consistent amount of fuel in the intake manifold so that the air/fuel ratio at engine restart can be controlled with minimal variation from start to start and therefore help reduce variability of tailpipe emissions at engine restarts during the drive cycle operation of an HEV.

The above objects and advantages of the present invention will become more readily apparent from the following description taken with the following drawings.

DETAILED DESCRIPTION OF THE PREFERRED EMBODIMENT

Figure 1:
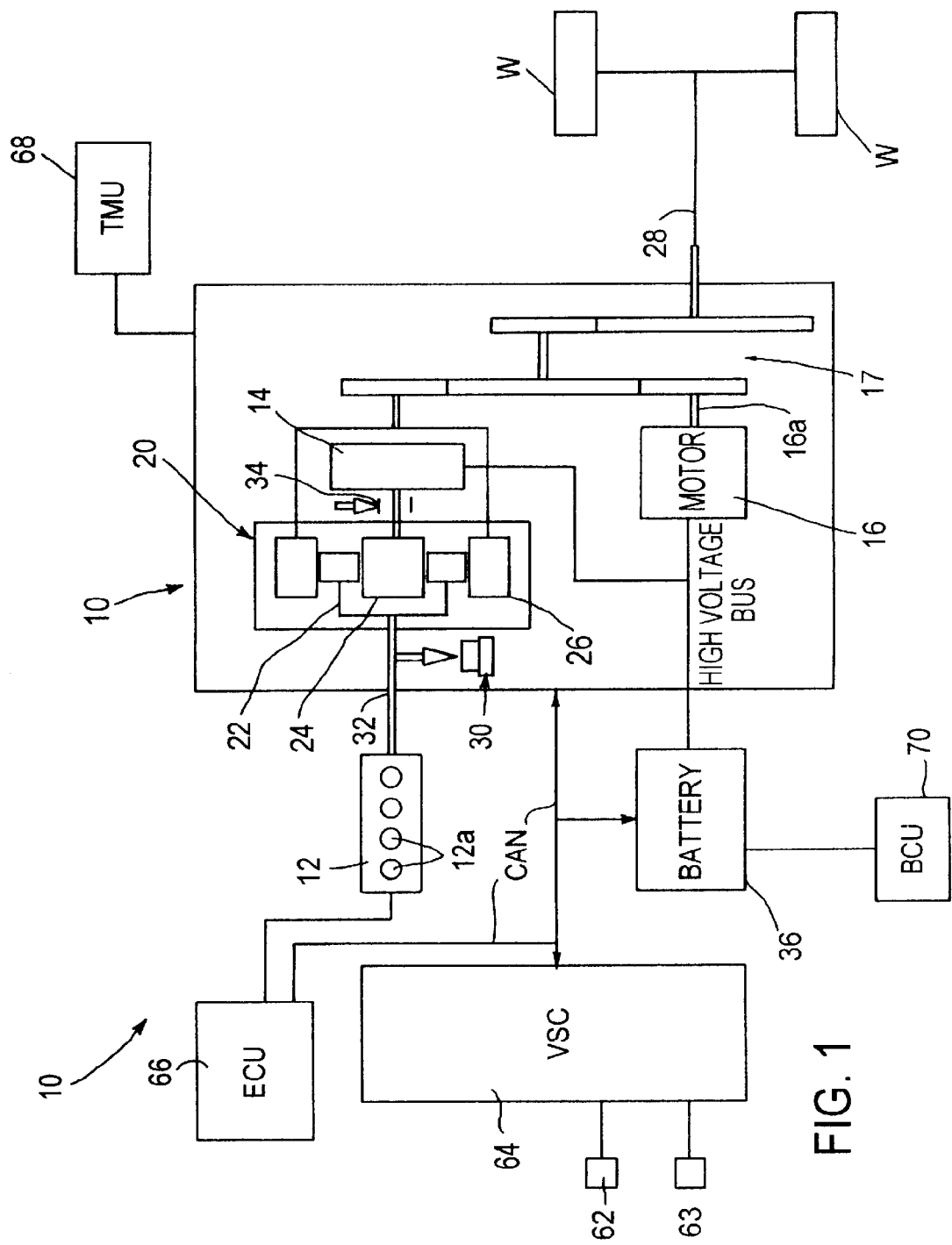
FIG. 1 is a schematic diagram of an illustrative drive system of a HEV.

Referring to FIG. 1, there is shown a drive system 10 of a hybrid electric vehicle (HEV) offered for purposes of illustrating the invention and not limiting it. The drive system 10 is illustrated as a "powersplit" propulsion system, which combines the functions of both series and parallel hybrid system, and which includes an internal combustion engine (ICE) 12, an electric motor/generator 14, and an electric traction motor 16. The electric traction motor 16 is connected via gear train 17 to the transaxle output shaft 28 that powers a pair of wheels W of the HEV. The present invention can apply to and be practiced to control shutdown of any ICE, and is particularly useful with any HEV that is capable of stopping the ICE while one or more control systems is/are kept running or operational.

The ICE 12 and generator 14 are interconnected by use of a conventional planetary gear set 20, which includes a carrier 22, a sun gear 24 and a ring gear 26. Drive system 10 further includes a conventional one-way clutch 30, which selectively and operatively engages the output shaft 32 of ICE 12, and a brake and clutch assembly 34, which selectively and operatively engages the rotor (not shown) of the generator 14.

A conventional electrical energy storage device 36 (e.g., one or more batteries or other charge storage devices) is electrically coupled to generator 14 and to traction motor 16. Electrical energy storage device 36 receives and provides power from/to generator 14 and electric traction motor 16 via a high voltage bus.

The ICE 12 is a conventional internal combustion engine (illustrated as an in-line four cylinder engine) which drives output shaft 32 coupled to the carrier 22 of the planetary gear set 20.

Generator 14 is a conventional electric motor/generator including a stator assembly and a rotor assembly (not shown), which is physically and operatively coupled to the sun gear 24 of the planetary gear set 20. Planetary gear set 20 allows the ICE 12 and generator 14 to cooperate as a single power source that provides a single power or torque output from the ring gear 26 to the transaxle output shaft 28, and on to the vehicle wheels W. The planetary gear set 20 further serves as a power split device that splits the output from ICE 12 to the generator 14 and to the transaxle output shaft 28. Generator 14 selectively provides a negative reaction torque to the engine-produced torque, thereby controlling the engine speed. By doing so, generator 14 converts rotational energy to electrical energy that is stored within the battery 36 and which can be used to electrically power the traction motor 16 and various other electrical components of the vehicle.

The electric traction motor 16 is a conventional electric motor that acts as a second power source that provides torque and power to the transaxle output shaft 28 independently from the first power source (i.e., ICE 12 and generator 14). In this manner, the two power sources (i.e., ICE 12 and generator 14 as one, and electric traction motor 16 as the other) deliver torque and power to the vehicle simultaneously and independently. The electric traction motor 16 further converts drive train energy into electrical energy by operating as a generator during regenerative braking.

A vehicle system controller (VSC) 64 receives signals and/or commands generated by driver inputs 62 (e.g., gear selection, accelerator position, and braking effort commands), and from vehicle operating condition sensors 63 (e.g., vehicle speed, battery state of charge) and processes the received signals to determine the amount of torque to be provided to the transaxle output shaft 28. VSC 64 then sends commands to the appropriate subsystem controllers 66 (ECU—Engine Control Unit), 68 (TMU—Transaxle Control Unit), and 70 (BCU—Battery Control Unit), which then cooperatively provide the desired torque to the transaxle output shaft 28. VSC 64 and controllers 66, 68, 70 communicate over a controller area network (CAN) bus. Specifically, VSC 64 determines the total amount of torque that is to be delivered to transaxle output shaft 28 and partitions or divides the torque among the various subsystems.

Figure 2:
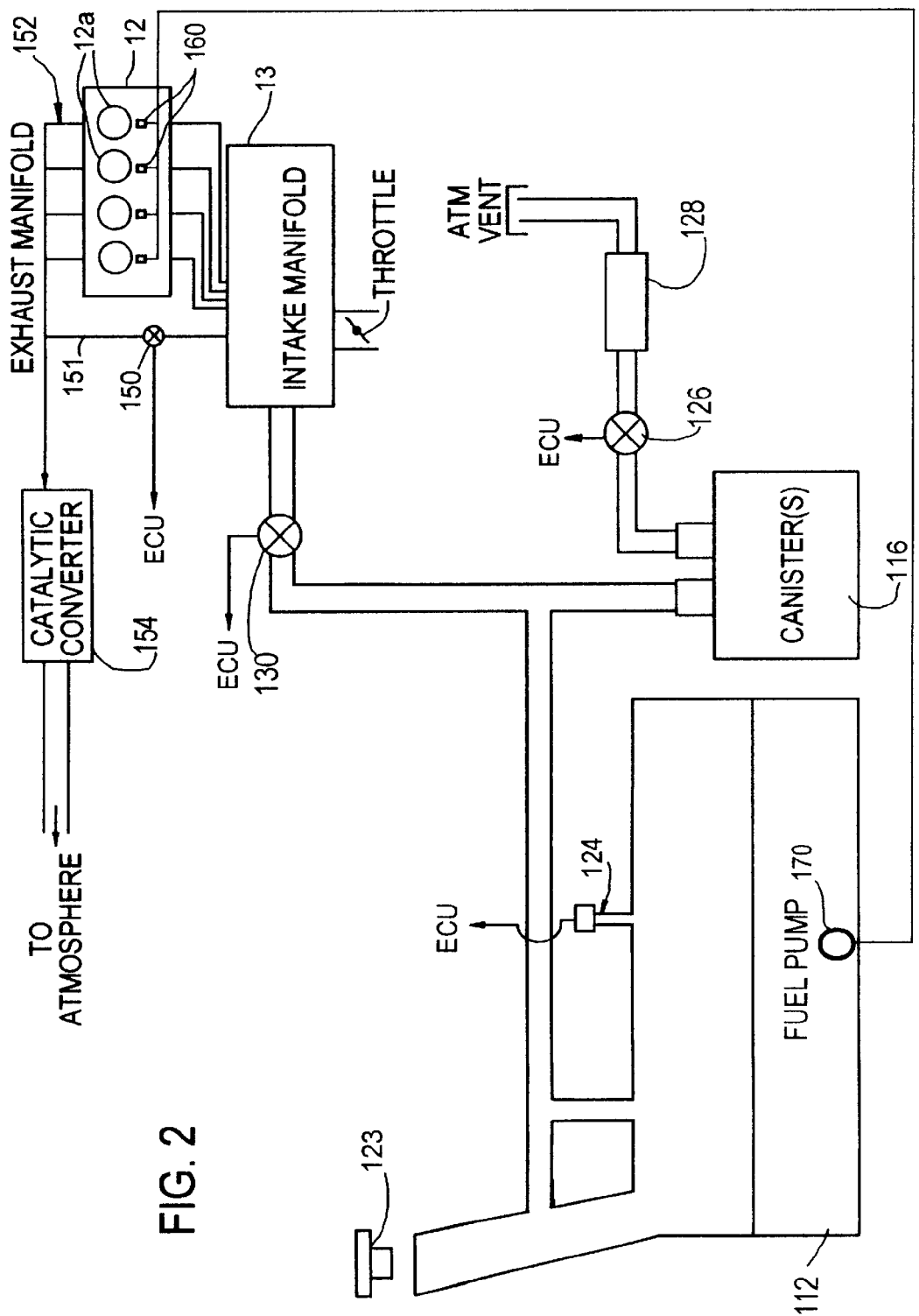
FIG. 2 is a schematic diagram of the tailpipe and evaporative emissions control systems of an ICE.

The ICE 12 is provided with an evaporative emission control system illustrated in FIG. 2. The system includes a fuel tank 112 from which fuel is supplied to the fuel injectors 160 of ICE 12 via a conventional fuel pump 170. A conventional vacuum relief valve (not shown) is provided on the fuel tank cap 123 for equalizing pressure applied to the fuel tank. The fuel tank 112 further includes a pressure transducer 124 for sensing fuel tank pressure or vacuum and for providing an input signal to the ECU 66. A fuel vapor canister 116 is provided for trapping, storing and subsequently releasing fuel vapor dispelled from the fuel tank 112 for combustion in the ICE 12 as controlled by a conventional vapor management valve (VMV) 130. The canister 116 is connected to ambient atmosphere ATM through a canister vent valve 126. A filter 128 may be provided between the vent valve 126 and the atmosphere for filtering the air pulled into the canister 116. The vent valve 126 is a normally open solenoid controlled valve controlled by the ECU 66 via an electrical connection to the vent valve 126.

The VMV 130 is interposed between the intake manifold 13 of ICE 12 and the fuel tank 112 and the canister 116. The VMV 130 comprises a normally closed solenoid valve that is also controlled by ECU 66. When the VMV 130 opens, the vacuum of the intake manifold 13 establishes a vacuum in the canister 116 and fuel tank 112 and thereby draws fuel vapor from the canister 116 into the cylinders 12a of ICE 12 to be combusted. When the ECU 66 de-energizes the VMV 130, the path to the intake manifold is closed and thus the fuel vapor can only be stored in the canister 116.

The ICE 12 is provided with a tailpipe emission control system illustrated in FIG. 2 that includes an exhaust gas recirculation (EGR) valve 150 disposed in a conduit or passage 151 between the exhaust manifold 152 and intake manifold 13 of ICE 12. The EGR valve 150 is used to recirculate a portion of the hot exhaust gases back into the intake manifold 13, thereby diluting the air/fuel charge and lowering combustion temperatures to reduce the amount of NOx (oxides of nitrogen) that are created. The amount of exhaust gases recirculated into the intake manifold 13, and thus into the cylinders 12a, is proportional to how much the EGR valve 150 is opened. The EGR valve 150 can be a vacuum operated solenoid valve or can be driven by a DC stepper motor. In either case, the EGR valve is also controlled by ECU 66. The EGR valve 150 is opened to an extent to control the amount of exhaust gases recirculated into the intake manifold 13 as dictated by the ECU 66. When the ECU 66 de-energizes the EGR valve 150, no exhaust gases are recirculated to intake manifold 13.

The present invention provides a method and control system for shutdown of the ICE 12 of an HEV in a manner that provides a more consistent amount of residual fuel vapor in the intake manifold of the ICE at each engine shutdown and thus at each engine restart as the engine is cycled between the "on" state and "off" state during operation of the HEV. In particular, the invention involves ICE shutdowns that occur during the drive cycle of an HEV wherein the VMV 130 of the evaporative emissions control system and the EGR valve 150 of the tailpipe emission control system are disabled (shut off or closed) at the time of ICE shutdowns that occur during the drive cycle of an HEV. The shutdown command is sent from VSC 64 to a controlled engine shutdown software routine (code means) of a computer program embodied in an electronic memory of ECU 66 that, after closing of the valves, commands disabling of conventional engine fuel injectors 160 operatively associated with cylinders 12a to stop engine operation.

In an illustrative embodiment of the invention, the VMV 130 and EGR valve 150 are disabled (shut off) at the time the engine shutdown command is provided to a controlled engine shutdown routine of ECU 66, and prior to the fuel injectors 160 being disabled by the controlled engine shutdown routine. After the fuel injectors are disabled, the VSC 64 instructs generator 14 of the HEV to spin the ICE 12 for a predetermined time, thereby pushing any residual fuel vapor out of the intake manifold 13 into the hot catalytic converter 154 to be converted. The controlled engine shutdown routine commands the ICE ignition system to continue firing the ICE spark plugs during the time period that the fuel injectors 160 are being disabled and the ICE 12 is being spun by the generator 14 until the engine speed drops below a predetermined value.

Figure 3:
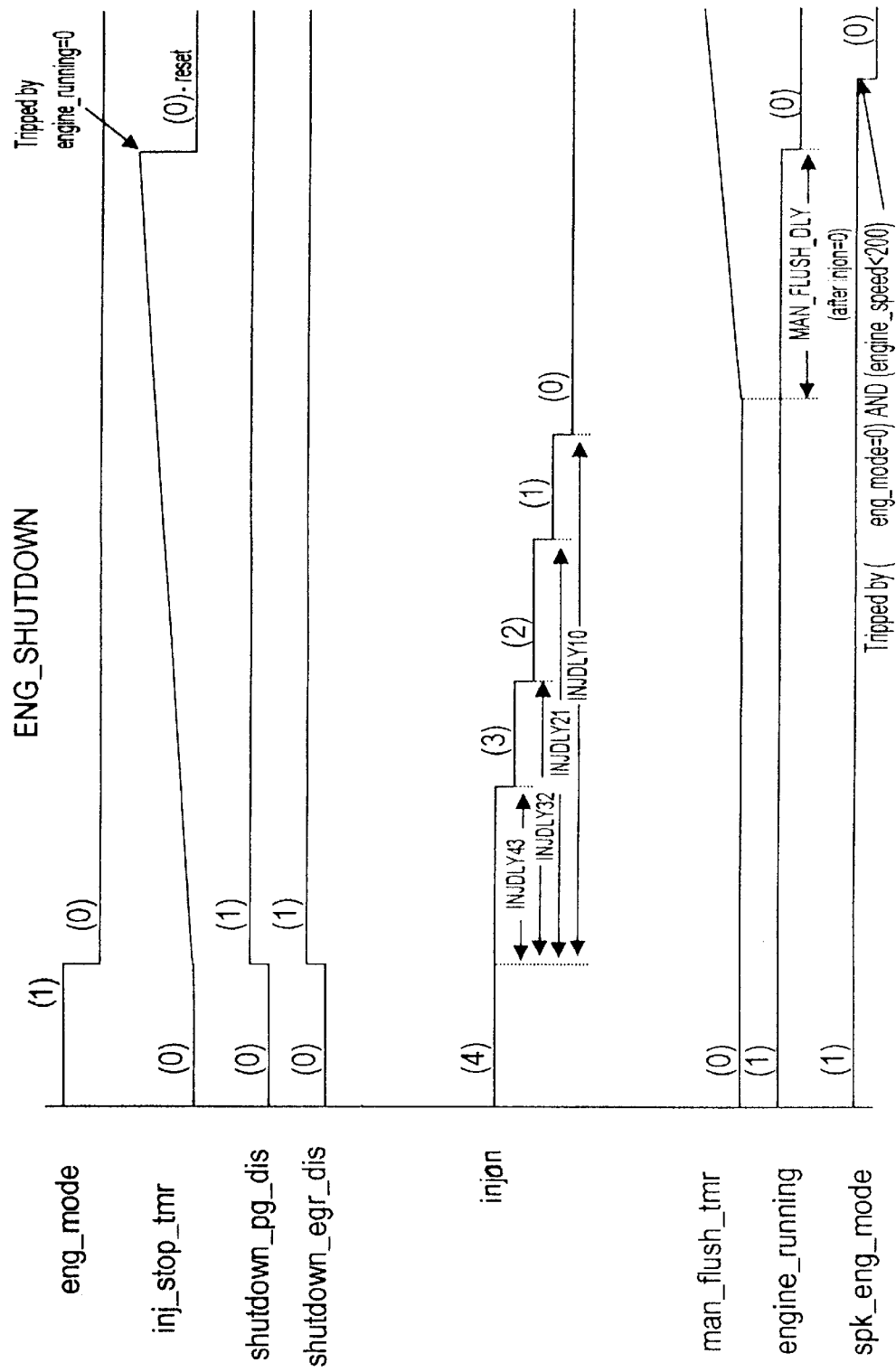
FIG. 3 is a logic and timing diagram of an example controlled engine shutdown routine illustrating the practice of a method embodiment of the invention.

Referring to FIG. 3, a sample controlled engine shutdown software routine embodied in ECU 66 is shown for purposes of illustration, but not limitation. Alternately, the engine shutdown software routine can be embodied in a powertrain control module (PCM) that contains conventional ECU 66 functions as well as VSC 64 functions.

In FIG. 3, the parameter engine_mode is the engine operating mode that VSC 64 desires of the ECU 66. For example, in FIG. 3, "0" mode requests the ICE 12 to be "off" (no combustion mode); "1" mode requests the ICE 12 to be "on" (combustion mode).

Whenever the VSC 64 sets engine_mode=1, a shutdown_pg_dis flag is set to 0 in the engine shutdown routine of ECU 66 requesting that the VMV 130 be allowed to function normally as dictated by the conventional VMV control strategy. Similarly, a shutdown_egr_dis flag is set to 0 requesting that the EGR valve 150 be allowed to function normally as dictated by the conventional EGR control strategy.

However, when the VSC 64 sets engine_mode=0, thereby requesting the ICE 12 to be "off", the shutdown_pg_dis flag is set to 1 in the engine shutdown routine of ECU 66 requesting that the VMV 130 be shut off (closed). Similarly, the shutdown_egr_dis flag is set to 1 in the engine shutdown routine requesting that the EGR valve 150 be unconditionally and immediately shut off (closed). The flags shutdown_pg_dis and shutdown_egr_dis are cleared from the engine shutdown routine if shutdown is aborted or completed.

When the shutdown command (via engine_mode=0) is provided by VSC 64 to ECU 66, the fuel injectors 160 can be disabled in a ramp mode over time where individual fuel injectors are disabled in a calibratable sequence (e.g., all fuel injectors off at once, 2 fuel injectors off at a time, or 1 fuel injector off at a time).

In FIG. 3, inj_stop_tmr is a timer used to pace the ramping off of the fuel injectors 160 via the parameter injon. Injon is an ECU 66 parameter that refers to the total number of injectors 160 being commanded "on" at a given moment. In this four cylinder engine example, when injon=4, all four fuel injectors 160 for cylinders 12a are commanded on. When injon=3, three of the four fuel injectors 160 for cylinders 12a are commanded on and so on. When injon=0, none of the four fuel injectors 160 for cylinders 12a are commanded on. In FIG. 3, INJDLY43 is the time delay from the ECU 66's receiving the engine shutdown command (engine_mode=0) to when one injector is turned off. INJDLY32 is the time delay from the ECU 66's receiving the engine shutdown command to when two injectors are turned off. INJDLY21 is the time delay from the ECU 66's receiving the engine shutdown command to when three injectors are turned off. INJDLY10 is the time delay from the ECU 66's receiving the engine shutdown command to when all four injectors are turned off.

MAN_FLUSH_DLY is the calibratable time delay from when the ICE 12 has stopped fueling (injon=0) to when the intake manifold has been sufficiently cleaned of residual fuel. The ICE 12 will continue to be spun by generator 14 until this calibratable delay has expired. Man_flush_tmr is a timer that begins when the fuel injectors 160 have been commanded off (via injon=0) and allows the intake manifold to be flushed of residual fuel vapor (by TMU 68 commanding the generator 14 to spin the ICE 12).

The engine_running flag is provided to the VSC 64 to indicate whether the ICE is producing torque on its own (i.e., combustion is occurring). This flag is set to 0 in the engine shutdown routine when flushing of the intake manifold 13 is complete. Once the engine_running flag=0, all timers and flags in the shutdown routine are reset, and the engine shutdown process is exited by ECU 66.

The flag spk_eng_mode is a spark enable/disable command in the engine shutdown routine of ECU 66 that enables the ignition system of ICE 12 (i.e., fires the spark plugs) if set=1, or disables the ignition system (i.e., does not fire the spark plugs) if set=0. In the engine shutdown process, the ignition system is left enabled during the time period that the fuel injectors 160 are being disabled and the ICE 12 is being spun by the generator 14, until the engine speed drops below a predetermined value (200 rpm, for example). Then, the command is given to the ignition system of ICE 12 to discontinue firing the spark plugs (spk_eng_mode=0).

The present invention is advantageous to provide a more consistent amount of residual fuel vapor in the intake manifold of the ICE 12 at each engine shutdown, and therefore at each engine restart, during an HEV drive cycle. This is accomplished by eliminating contributions of fuel vapor to the intake manifold from the VMV and EGR valve at engine shutdown. The engine thereby can be restarted with a more consistent amount of fuel vapor in the intake manifold so that the air/fuel ratio at engine restart can be robustly calibrated and controlled with minimal variation from start to start and therefore help reduce variability of tailpipe emissions at engine restarts during the drive cycle operation of an HEV.

While the invention has been described above in terms of specific embodiments, it is not intended to be limited thereto but rather only to the extent set forth in the appended claims.

What is claimed is:

1. A method of controlling an internal combustion engine having a plurality of fuel injectors, an evaporative emission control system including a vapor management valve between a fuel tank and an engine intake manifold, and an EGR valve between an engine exhaust manifold and the intake manifold, comprising closing said vapor management valve and said EGR valve prior to disabling of said fuel injectors as part of an engine shutdown routine in response to an engine shutdown command and, after said closing, said routine commanding disabling of said fuel injectors in a manner to stop engine operation, thereby eliminating contributions of fuel to said intake manifold from said vapor management valve and said EGR valve prior to stopping of said engine.

2. In a method of operating a hybrid electric vehicle where an internal combustion engine is stopped and restarted in response to commands from a vehicle system controller, the improvement comprising stopping the internal combustion engine according to claim 1.

3. A method of controlling an internal combustion engine having a plurality of fuel injectors, an evaporative emission control system including a vapor management valve between a fuel tank and an engine intake manifold, and an EGR valve between an engine exhaust manifold and the intake manifold, comprising closing said vapor management valve and said EGR valve as part of an engine shutdown routine in response to an engine shutdown command and, after said closing, said routine commanding disabling of said fuel injectors in a sequence over a predetermined time period to stop engine operation.

4. The method of claim 3 including rotating a crankshaft of the internal combustion engine for a second predetermined time after said predetermined time period using an electric motor of a hybrid electric vehicle.

5. The method of claim 4 wherein said routine further commands an ignition spark during the predetermined time periods until engine speed drops below a predetermined value.

6. For use with an internal combustion engine having a plurality of fuel injectors, an evaporative emission control system including a vapor management valve between a fuel tank and an engine intake manifold, and an EGR valve between an engine exhaust manifold and the intake manifold, an engine control system that commands closure of said vapor management valve and said EGR valve at a time when an engine shutdown command is received and that, after said closure, commands disabling of the fuel injectors in sequence over a predetermined time period to stop engine operation.

7. The system of claim 6 that commands rotation of a crankshaft of the internal combustion engine for a second predetermined time after said predetermined time period.

8. The system of claim 7 that enables the ignition system to fire the spark plugs during the predetermined time periods until engine speed drops below a predetermined value.

9. For use with an internal combustion engine having a plurality of fuel injectors, an evaporative emission control system including a vapor management valve between a fuel tank and an engine intake manifold, and an EGR valve between an engine exhaust manifold and the intake manifold, an engine control system that commands closure of said vapor management valve and said EGR valve prior to disabling of said fuel injectors when an engine shutdown command is received and that, after said closure, commands disabling of the fuel injectors in a manner to stop engine operation, thereby eliminating contributions of fuel to said intake manifold from said vapor management valve and said EGR valve prior to stopping of said engine.

10. A hybrid electric vehicle having an electric motor and an internal combustion engine controlled by the system of claim 9.

11. A hybrid electric vehicle having an electric motor, an internal combustion engine having a plurality of fuel injectors, an evaporative emission control system including a fuel vapor storage canister with a purge valve between a fuel tank and an engine intake manifold, and an EGR valve between an engine exhaust manifold and the intake manifold, and an engine control system for controlling said internal combustion engine and having an engine shutdown routine that commands closure of said purge valve and said EGR valve prior to disabling of said fuel injectors when an engine shutdown command is received and that, after said closure, commands disabling of said fuel injectors in a manner to stop engine operation, thereby eliminating contributions of fuel to said intake manifold from said purge valve and said EGR valve prior to stopping of said engine.

12. An electronic memory containing a computer program to be executed by an engine controller which controls fuel injectors supplying fuel to the engine, a canister purge valve between a fuel tank and an engine intake manifold, and an EGR valve between an engine exhaust manifold and the intake manifold, comprising an engine shutdown code means that commands closure of said purge valve and said EGR valve prior to disabling of said fuel injectors when an engine shutdown command is received and that, after said closure, commands disabling of said fuel injectors in a manner to stop engine operation, thereby eliminating contributions of fuel to said intake manifold from said purge valve and said EGR valve prior to stopping of said engine.

* * * * *